US010346071B2

(12) United States Patent
Webster (10) Patent No.: US 10,346,071 B2
(45) Date of Patent: Jul. 9, 2019

(54) VALIDATING FIRMWARE FOR DATA STORAGE DEVICES (71) Applicant: Western Digital Technologies, Inc., Irvine, CA (US)

(72) Inventor: Michael W. Webster, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 28 days.

(21) Appl. No.: 15/394,700

(22) Filed: Dec. 29, 2016

(65) Prior Publication Data
US 2018/0188986 A1 Jul. 5, 2018

(51) Int. Cl.
G06F 9/4401 (2018.01)
G06F 3/06 (2006.01)
G06F 21/57 (2013.01)
H04L 9/32 (2006.01)
G06F 21/51 (2013.01)

(52) U.S. Cl.
CPC .......... G06F 3/0622 (2013.01); G06F 3/0637 (2013.01); G06F 3/0673 (2013.01); G06F 9/4401 (2013.01); G06F 21/51 (2013.01); G06F 21/575 (2013.01); H04L 9/3247 (2013.01)

(58) Field of Classification Search
CPC .................................................. G06F 9/4401
See application file for complete search history.

(56) References Cited

U.S. PATENT DOCUMENTS

| 6,546,492 | B1 | 4/2003 | Walker et al. |
| 8,250,373 | B2 | 8/2012 | Hyser |
| 8,285,980 | B1 | 10/2012 | Feng et al. |
| 9,270,683 | B2 | 2/2016 | Coughlin et al. |
| 9,276,749 | B2 | 3/2016 | Tenenboym et al. |
| 9,735,960 | B2 * | 8/2017 | Hagiwara ............. H04L 9/0877 |
| 2013/0191624 | A1 | 7/2013 | Jarmay |
| 2013/0275769 | A1 | 10/2013 | Khosravi |
| 2014/0068275 | A1 | 3/2014 | Swanson et al. |
| 2015/0067314 | A1 * | 3/2015 | Strauss ................. G06F 21/572 713/2 |
| 2015/0277930 | A1 * | 10/2015 | Sarangdhar ........... G06F 21/575 713/2 |
| 2016/0217099 | A1 | 7/2016 | McCabe et al. |

FOREIGN PATENT DOCUMENTS

EP 1934879 A2 6/2008
WO 2015165000 A1 11/2015

OTHER PUBLICATIONS

International Search Report and Written Opinion for PCT/US2017/051221 dated Nov. 29, 2017.

* cited by examiner

Primary Examiner — Edward J Dudek, Jr.
(74) Attorney, Agent, or Firm — Chang & Hale LLP (57) ABSTRACT Systems and methods are disclosed for validating firmware and/or firmware images. A data storage device may transmit a request to validate a firmware image, to a storage drive. The data storage device may receive data indicating whether the firmware image is valid, from the storage drive. The data storage device may initiate operation using the firmware image if the firmware image is valid.

18 Claims, 6 Drawing Sheets

VALIDATING FIRMWARE FOR DATA STORAGE DEVICES

BACKGROUND

Distribution of data storage across one or more data storage devices can provide increased data security through data redundancy. One type of data storage device may be a direct-attached storage (DAS) device. DAS devices may provide one or more computing devices with direct access to data via a connection cable (e.g., via a direct or physical connection). Another type of data storage device may be a network-attached storage (NAS) device. NAS devices may provide access to data over computer networks (e.g., via a wired and/or wireless network).

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claimed invention. Disclosed herein are example implementations, configurations, and/or embodiments relating to validating firmware and/or other software for electronic devices, such as data storage devices.

Overview

Data storage devices/systems may provide one or more computing devices with file-level data storage. One example of a data storage device/system may be a direct-access storage (DAS) device. The DAS device may be coupled to a computing device (e.g., a laptop computer, a desktop computer, etc.) via a connection cable (e.g., a Thunderbolt cable, an external serial advanced technology attachment (eSATA) cable, a universal serial bus (USB) cable, etc.) coupled to a direct-access interface (e.g., a communication interface such as USB 2.X, USB 3.X, Thunderbolt, eSATA, etc.) of the DAS device. A DAS device may provide a convenient mechanism for transferring data between computing devices, increasing the storage capacity (e.g., increasing the storage space) of a computing device, and/or providing increased data security through data redundancy. Another example of a data storage device/system may be a network-access storage (NAS) device. A NAS device may be coupled to a network via a network-access interface (e.g., a network interface or a communication interface such as Ethernet, 802.11 (Wi-Fi), etc.). A NAS device may provide file-level data storage over a network (e.g., a computer network), where the stored data is accessible to a group of clients. For example, a NAS device may include hardware, software, or a combination of such elements, configured such that the NAS device operates as a file server. NAS devices/systems can provide a convenient mechanism for sharing data among multiple computers and/or remotely accessing data stored on the NAS devices/systems. As compared to traditional file servers, benefits of NAS devices/systems may include the ability to access data from various locations (e.g., remote locations), faster data access, easier administration, and/or simpler configuration.

Certain embodiments disclosed herein provide the ability to validate firmware (and/or other software) for an electronic device (such as a data storage device) when initiating operation of the electronic device (e.g., booting the electronic device) and/or when updating/installing the firmware on the electronic device.

Data Storage Devices

Figure 1:
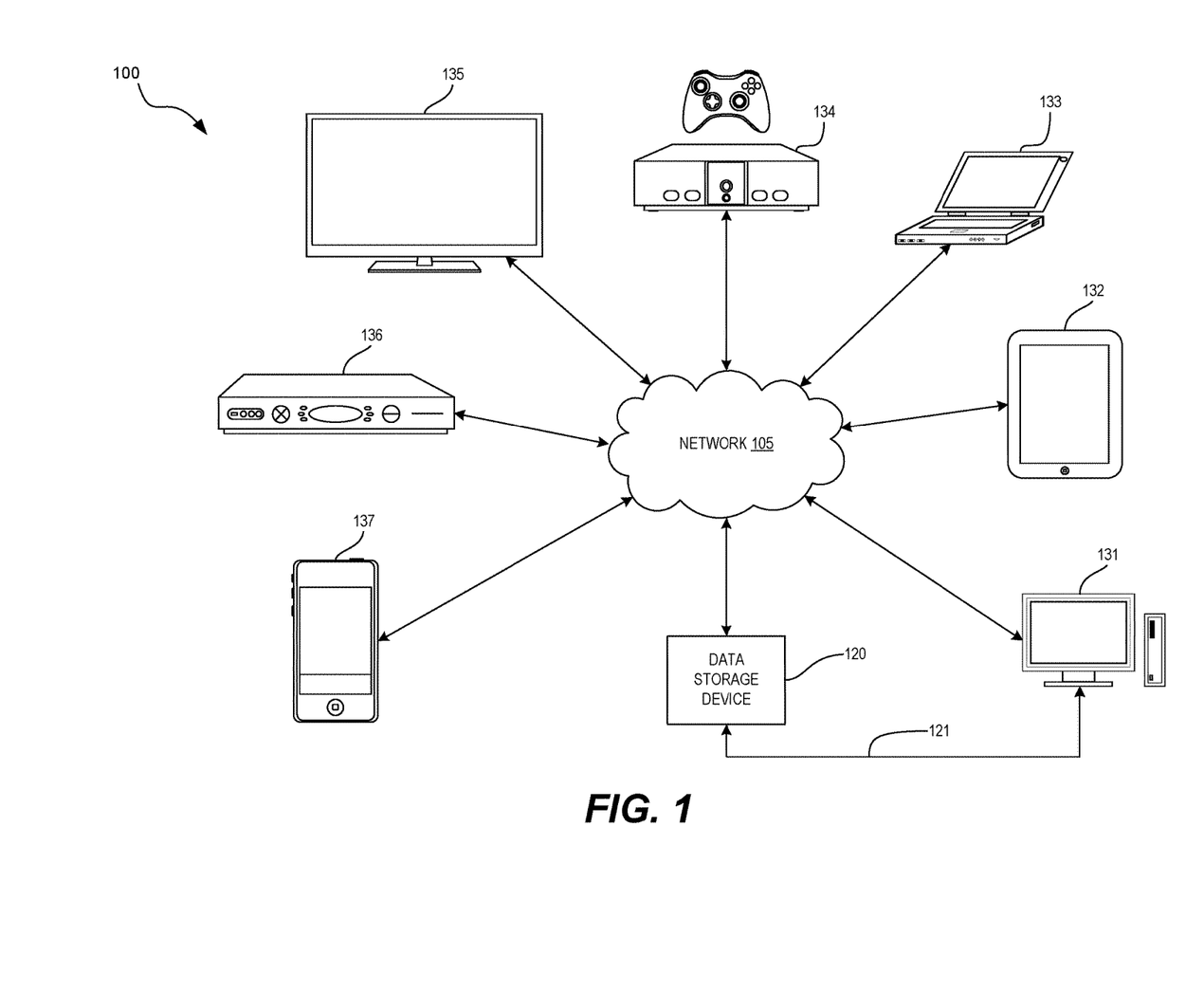
FIG. 1 is a diagram of a data storage system, according to an embodiment.

FIG. 1 is a diagram of a data storage system 100, according to an embodiment. In the data storage system 100, a data storage device 120 may be communicatively coupled to one or more client devices (e.g., one or more computing devices) in order to provide file-based data storage services to the one or more client devices. Types of client devices that may have access to the data storage device 120 may include, but are not limited to, phones 137 (e.g., smart phones, cellular phones, etc.), cable set-top boxes 136, smart televisions (TVs) 135, video game consoles 134, laptop computers 133, tablet computers 132, desktop computers 131, wearable computers and/or other types of computing devices. In one embodiment, the data storage device 120 may be an external standalone data storage device. For example, the data storage device 120 may be a data storage device that is not located within a computing device (e.g., not within a case or housing of a computing device). In another example, the data storage device 120 may be a data storage device that may provide access to data without being directly coupled to a computing device (e.g., may be a NAS device). The client devices may also be referred to as host systems. In one embodiment, the data storage device 120 may be a portable data storage device. The portable data storage device may lack a power source (e.g., may lack a battery and/or an alternating current (AC) adaptor) and may receive power from the client devices (e.g., host systems).

The data storage device 120 may provide various client devices (e.g., phones 137, cable set-top boxes 136, smart TV's 135, video game consoles 134, laptop computers 133, tablet computers 132, desktop computers 131) with access to various types of user data stored on the data storage device 120. The data storage device 120 may also allow users to store various types of user data on the data storage device 120. The data storage device 120 may comprise magnetic media, hard disk media, and/or solid-state media. While certain description herein refers to solid state memory generally, it is understood that solid state memory may comprise one or more of various types of solid state non-volatile memory devices such as flash integrated circuits, Chalcogenide random-access memory (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, electrically erasable programmable read-only memory (EEPROM), Ferroelectric Memory (FeRAM), Magnetoresistive RAM (MRAM), other discrete non-volatile memory (NVM) chips, or any combination thereof.

With further reference to FIG. 1, the data storage device 120 (e.g., magnetic disk drive, hybrid hard drive, solid-state drive, etc.) may include a controller (not shown in FIG. 1) configured to receive data commands and to execute such commands in one or more non-volatile storage components of the data storage device 120. Such commands may include data read/write commands and the like. The controller may be configured to receive data commands from a communication interface (e.g., a network-access interface and/or a direct-access interface) residing on a computing device (e.g., a host system). Data commands may specify a block address in the data storage device 120, and data may be accessed/transferred based on such commands. The data commands may also be referred to as data access requests.

The data storage device 120 may be configured to store data in one or more magnetic recording disks and/or the solid state memory devices/arrays. In an embodiment, the data storage device 120 may comprise a cable box, a backup disk drive, a media storage unit, a streaming media device, a digital camera, or any other electronic device which may store data that may need to be accessed directly or wirelessly.

In certain embodiments, the data storage device 120 may store data received from a client device such that the data storage device 120 acts as data storage for the client device. To facilitate this function, the data storage device 120 may implement a logical interface. The logical interface can present to the client device memory as a set of logical addresses (e.g., sequential/contiguous addresses) where data may be stored. Internally, the controller may map logical addresses to various physical memory addresses in the non-volatile memory of the data storage device 120. Mapping data indicating the mapping of logical addresses to physical memory addresses may be maintained in the data storage device 120.

In one embodiment, the data storage device 120 may be a DAS device. The DAS device may be directly coupled to a client device (e.g., a desktop computer 131) via a connection cable 121. The connection cable 121 may be coupled to a communication interface (e.g., a USB 2.X interface, a USB 3.X interface, a Thunderbolt interface, etc.) of the DAS device (e.g., data storage device 120). In another embodiment, the data storage device 120 may also be a NAS device. The NAS device may also be coupled to the client devices 131-137 via a network 105. The NAS device may be coupled to the network 105 via a network interface (e.g., an Ethernet interface, an 802.11 (Wi-Fi) interface, etc.). Each of the client devices 131-137 may also be coupled to the network 105 via a network interface. In one embodiment, network 105 may include a public network (e.g., the Internet), a private network (e.g., a local area network (LAN)), a wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other types of computer networks, and/or a combination thereof. Although FIG. 1 illustrates the data storage device 120 as being coupled to the client device 131, the data storage device may be coupled to any number of the client devices 131-137 via one or more connection cables in other embodiments.

In one embodiment, the data storage device 120 may receive data access requests from the client devices 131-137 via the communication interface (e.g., a direct-access interface such as USB 2.X, USB 3.X, Thunderbolt) and/or via the network interface (e.g., Ethernet, 802.11, etc.). The data access requests may be messages, commands, and/or requests to access data on the data storage device. For example, a data access request may indicate that a computing device wants to read data from the data storage device 120. In another example, a data access request may indicate that a computing device wants to write data to the data storage device 120.

Data storage devices, such as data storage device 120, may use firmware (and/or other software) to perform various operations and/or functions. For example, firmware may be used to control various low-level functions/operations of the data storage device 120. In another example, the firmware may be used to operate the data storage device 120 (e.g., to allow the data storage device 120 to communicate with the client devices, to read/write data from/to a storage medium, etc.). The firmware (and/or other software) may be periodically updated to maintain the data storage device 120 and/or to improve the operation of the data storage device 120. For example, the firmware may be updated to resolve issues (e.g., errors) encountered by users of the data storage device 120. In another example, the firmware may be updated to add new functionalities/capabilities to the data storage device 120.

When updating the firmware of the data storage device 120 and/or when initiating operation of the data storage device 120 (e.g., booting the data storage device 120), it may be useful to prevent the data storage device 120 from using unauthorized or invalid firmware. For example, a user (e.g., a hacker or a malicious user) may attempt to install unauthorized/invalid firmware (e.g., firmware that is not authentic and/or is not provided by the manufacturer of the data storage device 120). Using the unauthorized/invalid firmware may cause the data storage device 120 to operate improperly and/or may result in security issues when the data storage device 120 is used. For example, the unauthorized/invalid firmware may allow unauthorized users to access data stored on the data storage device 120. In another example, the unauthorized/invalid firmware may cause errors to occur when the data storage device 120 accesses data, which may corrupt the data stored on the data storage device.

Figure 2:
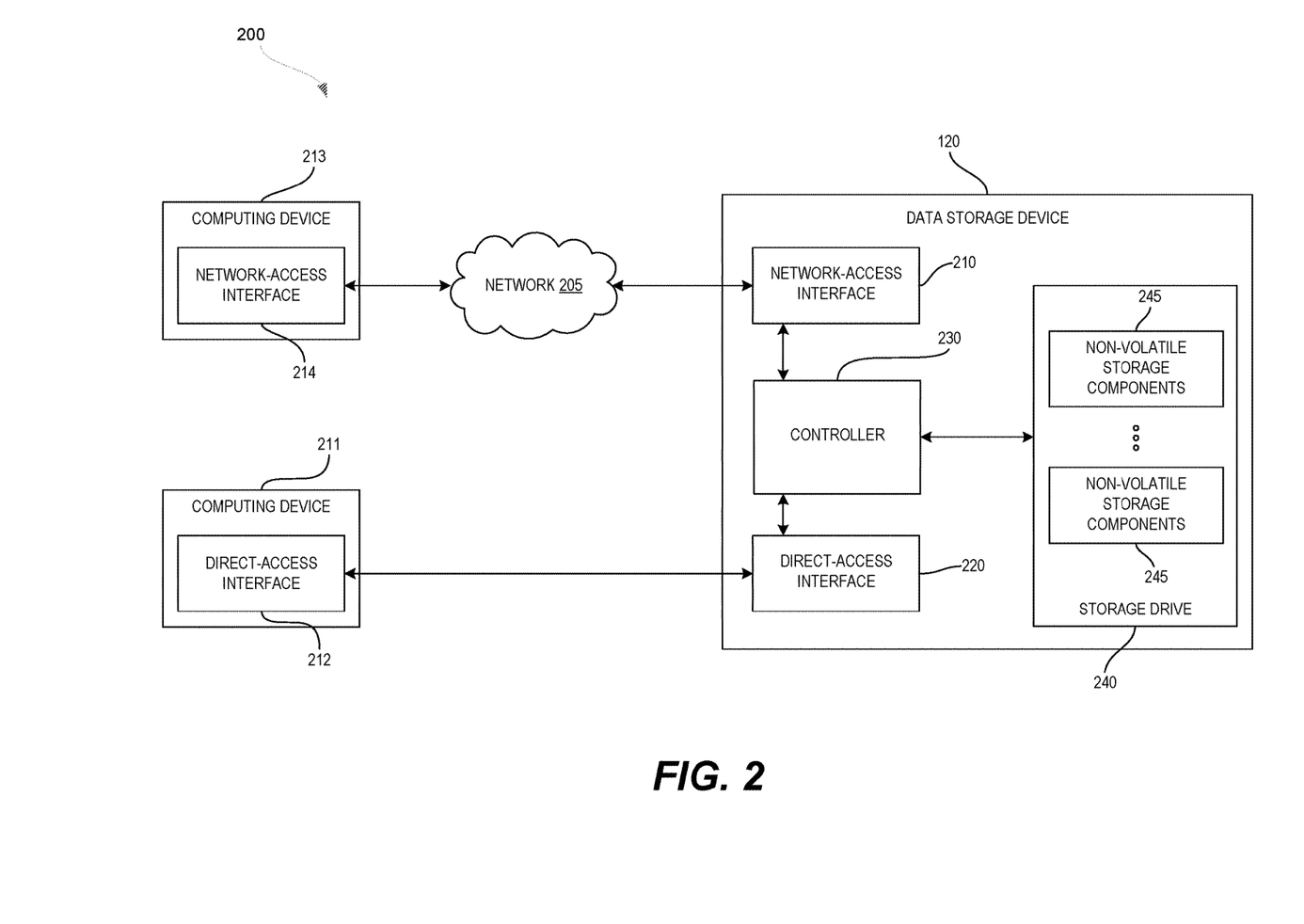
FIG. 2 is a diagram of a data storage system, according to an embodiment.

FIG. 2 is a diagram of a data storage system 200 according to an embodiment. The data storage system 200 includes a computing device 211, a computing device 213, a connection cable, and a data storage device 120. Each of the computing devices 211 and 213 may be a laptop computer, a desktop computer, a server computer, a tablet computer, a smart phone, a set-top box, a smart TV, a video game console, etc. The computing devices 211 and 213 may also be referred to as host systems. The data storage device 120 may include a controller 230, a direct-access interface 220 (e.g., USB 2.X, USB 3.X, Thunderbolt, eSATA, etc.), a network-access interface 210 (e.g., Ethernet, Wi-Fi, etc.), and non-volatile storage components 245. The controller 230 may be a processing device, such as a field-programmable gate array (FPGA), an application-specific integrated circuit (ASIC), a processor, a central processing unit (CPU), a system-on-chip (SoC), etc. In one embodiment, the non-volatile storage components 245 may include non-volatile magnetic media and/or solid-state memory, such as NAND flash. The controller 230 may provide overall control for the data storage device 120. In one embodiment, the data storage device 120 may be a portable data storage device. The portable data storage device may lack a power source (e.g., may lack a battery and/or an AC adaptor) and may receive power from the computing device 211 (e.g., a host system).

In certain embodiments, the data storage device 120 may be a hard disk drive. The non-volatile storage components 245 may include one or more disks, and the data storage device 120 may further include one or more heads (not shown) actuated radially over the disk(s) and a spindle motor for rotating the disk(s). Alternatively to, or in addition to, magnetic rotating media, solid-state memory and/or other non-volatile memory such as MRAM and/or phase change memory may be used. In certain embodiments, the data storage device 120 may be, for example, a hybrid hard drive including both magnetic media and solid-state media (e.g., the non-volatile storage components 245 may include both magnetic disks and solid state media/memory). In one embodiment, the non-volatile storage components 245 may be coupled to the controller via one or more serial bus connectors. Examples of serial bus connectors include, but are not limited to, serial ATA (SATA) connectors, peripheral component interconnect express (PCIe) connectors, and SATA Express connectors. In one embodiment, the data storage device 120 may be external standalone data storage devices (e.g., NAS devices/drives, portable external hard drives, etc.). In another embodiment, the data storage device 120 may be a portable data storage device. For example, the data storage device 120 may be a portable external hard drive. In another embodiment, data storage device 120 may receive power from the computing device 211 via a connection cable and the direct-access interfaces 212 and 220. For example, the data storage device 120 may not include a power source (e.g., a battery, a power adaptor, etc.) and may operate using power (e.g., voltage, current, etc.) received from the computing device 211 (e.g., a host system).

The controller 230 may receive data access requests (e.g., data and storage access commands) from a direct-access interface 212 (e.g., a USB interface, a Thunderbolt interface) of the computing device 211. Data access requests communicated by the direct-access interface 212 may include write and read commands issued by the computing device 211. The data access requests may specify a logical block address (LBA), or range of LBAs, in the data storage device 120, and the controller 230 may execute the received data access requests in the non-volatile storage components 245. The controller 230 may also receive data access requests from a network-access interface 214 (e.g., a communication interface such as an Ethernet interface, a Wi-Fi interface, etc.) of the computing device 213. The controller 230 may determine an LBA and/or a range of LBAs in the data storage device 120 based on the data access requests and may execute the received data access requests in the non-volatile storage components 245. In a hybrid hard drive, data may be stored in a magnetic media storage component as well as non-volatile solid-state memory.

The data storage device 120 may store data received from the computing devices 211 and 213, such that the data storage device 120 acts as memory for the computing devices 211 and 213. To facilitate this memory function, the controller 230 may implement a logical interface. The logical interface may present to the computing devices 211 and 213 the memory of the data storage device 120 as a set of logical addresses (e.g., contiguous addresses) where data can be stored. The controller 230 may map logical addresses to various physical memory addresses in the non-volatile storage components 245 and/or other memory module(s).

The data storage device 120 may be configured to implement data redundancy, wherein user data stored in the non-volatile storage components 245 is maintained in one or more internal and/or external drives. For example, the controller 230 may include a data redundancy management module (not shown in FIG. 2) configured to implement redundancy functionality. The data redundancy management module may implement redundant array of independent disks (RAID) technology, wherein the non-volatile storage components 245 includes a plurality of internal drives, disks, or other data storage partitions combined into a logical unit for the purposes of data redundancy and performance improvement. In addition, or alternatively, the data redundancy management module may be configured to implement RAID using one or more internal memory modules in combination with one or more external memory devices, as discussed in greater detail below.

For RAID purposes, the non-volatile storage components 245 may include an array of one or more storage devices, such as hard disks or other memory modules that are configured to store user data. In certain embodiments, such internal memory modules/disks may be each directly coupled to the controller 230 to provide a high bandwidth interface for reading and writing user data. The non-volatile storage components 245 may include one or more additional memory modules configured to store parity information.

The controller 230 may be configured to divide and replicate user data among the physical RAID memory modules, providing storage virtualization. The array may be accessed by the computing devices 211 and 213 as a single drive. Data may be distributed across the RAID memory modules/drives according to any desirable or practical RAID level, depending on the level of redundancy and/or performance desired. For example, the data storage device 120 may be configured to implement RAID 0, RAID 1, RAID 5, RAID 6, RAID 10, other RAID technology, or other erasure coding technology, depending on data reliability, availability, performance and/or capacity considerations or requirements.

The computing device 211 may be coupled to the data storage device 120 via a connection cable. The connection cable may directly connect the computing device 211 and the data storage device 120. The connection cable may use one or more communication interfaces (such as a bus interface) and/or protocols that may allow the computing device 211 to communicate with the data storage device 120. The direct-access interfaces 212 and 220 may be USB interfaces, Thunderbolt interfaces, serial attached SCSI (SAS), eSATA interfaces, etc.

In one embodiment, the connection cable may include one or more data lines (e.g., one or more wires, pins, etc.) that allow the computing device 211 to communicate data with the data storage device 120. For example, the connection cable may include data lines (not shown in FIG. 2) that the computing device 211 may use to read data from and/or write data to the data storage device 120. The computing device 211 may communicate data to and from the data storage device using the direct-access interface 212 (e.g., via the direct-access interface 212). In another embodiment, the computing device 211 may provide an input voltage to the data storage device 120, and the data storage device 120 may use the input voltage to operate one or more components of the data storage device 120 (e.g., the controller 230, the non-volatile storage components 245, a motor, etc.). The connection cable may include one or more voltage lines (e.g., wires, pins, etc.) that may receive the input voltage from the computing device 211 via the direct-access interface 212. The one or more voltage lines may provide the input voltage (received from the computing device 211) to the data storage device 120 via the direct-access interface 220. In a further embodiment, the data storage device 120 may be coupled to a separate power source (e.g., may be coupled to a battery, to an AC adaptor, to a wall outlet, etc.).

In one embodiment, the connection cable may include a bridge unit (not shown in FIG. 2). For example, the connection cable may include a USB bridge, a Thunderbolt bridge, or other type of bridge. The bridge unit may translate between two different types of communication interfaces and/or protocols. For example, if a connected storage device communicates in a first protocol, but not a second protocol, the bridge unit may translate the second protocol to the first protocol, or vice versa.

The computing device 213 may be communicatively coupled to the data storage device 120 via a network 205 (e.g., one or more of a Wi-Fi network, a LAN, a cellular network, etc.). The computing device 213 may send data (e.g., files, images, movies, etc.) and/or data access requests to the data storage device 120 via the network-access interface 214 (e.g., a communication interface, an Ethernet interface, a Wi-Fi interface, etc.) and the network 205. The data storage device 120 may receive the data and/or data access requests from the computing device 213 via the network-access interface 210.

In one embodiment, the data storage device 120 may include an encryption module (e.g., software, hardware, firmware or a combination thereof) that may encrypt/decrypt data (e.g., files) stored on the non-volatile storage components 245. For example, the encryption module may use encryption keys and/or encryption functions/algorithms to encrypt and/or decrypt data. In another embodiment, the data storage device 120 may include various sensors such as a compass (e.g., a magnetometer), a gyroscope, an accelerometer, a global positioning system (GPS) sensor, a temperature sensor (e.g., a thermometer), etc.

As discussed above, it may be useful to prevent the data storage device 120 from using unauthorized/invalid firmware. Using the unauthorized/invalid firmware may cause the data storage device 120 to operate improperly and/or may result in security issues when the data storage device 120 is used. A key (e.g., an encryption key, a cryptographic key, etc.) may be used to validate firmware (e.g., may be used to determine whether firmware is authentic). The key may be stored in a memory, such as a one-time programmable (OTP) memory. One having ordinary skill in the art understands that other types of memory, such as secure memory, may be used to store the key. The OTP memory may generally be included as part of the controller 230. Including the OTP memory in the controller 230 may increase the size, cost, and/or complexity of the controller 230.

In one embodiment, the controller 230 may determine whether a firmware image (for booting the data storage device and/or for operating the data storage device) has been validated by the storage drive 240. For example, the controller 230 may send a request (e.g., a message, a command, etc.) to validate the firmware image, to the storage drive 240. The controller 230 may boot (e.g., may begin/initiate operation of) the data storage device 120 using the firmware image if the firmware image has been validated by the storage drive 240, as discussed in more detail below. The controller 230 may also store the firmware image in a memory (e.g., a flash memory) if the firmware image has been validated by the storage drive 240, as discussed in more detail below. If the firmware has not been validated by the storage drive 240, the controller 230 may refrain from booting the data storage device 120, as discussed in more detail below. For example, the controller 230 may refrain from booting the data storage device 120 (e.g., may not boot the data storage device 120) if the firmware image is invalid and/or if the storage drive 240 is unable to validate the firmware image. The controller 230 may also refrain from storing the firmware image in the memory if the firmware image is invalid and/or if the storage drive 240 is unable to validate the firmware image.

In one embodiment, the storage drive 240 may receive a request to validate the firmware image, as discussed in more detail below. The storage drive 240 may determine whether the firmware image is valid based on a digital signature and a key (e.g., an encryption key, a cryptographic key, etc.), as discussed in more detail below. The storage drive 240 may transmit data (e.g., a value, a result, an alphanumeric string, etc.) to the controller 230 indicating whether the firmware image is valid, as discussed in more detail below.

Many storage drives have the ability to validate a firmware image of the storage drive (e.g., a storage drive firmware image). In one embodiment, the controller 230 may use this ability of the storage drive 240 (to validate firmware images) to validate a firmware image of the data storage device 120 (e.g., a data storage device firmware image). This may allow the OTP memory to be removed from the controller 230 which may decrease the size, cost, and/or complexity of the controller 230. This may also allow the controller 230 to offload the process of validating the data storage device firmware image to the storage drive 240, which may allow the controller 230 to operate more efficiently and/or perform other tasks, operations, functions, etc.

Validating Firmware

Figure 3:
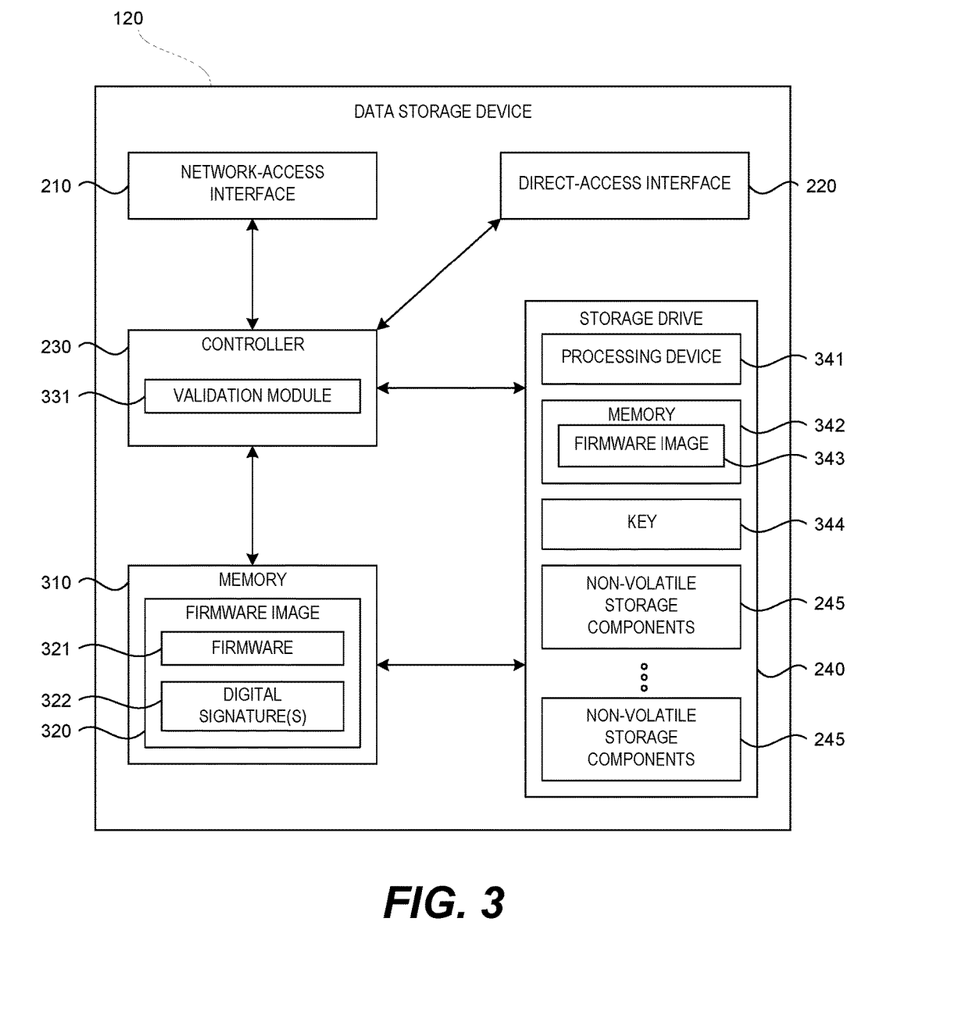
FIG. 3 is a diagram of a data storage device, according to an embodiment.

FIG. 3 is a diagram of a data storage device 120 according to an embodiment. The data storage device 120 includes a network-access interface 210 (e.g., Ethernet, Wi-Fi, etc.), a direct-access interface 220 (e.g., USB 2.X, USB 3.X, Thunderbolt, eSATA, etc.), a controller 230, a memory 310, and a storage drive 240. The data storage device 120 may communicate data (e.g., transmit data and/or receive data) with a computing device and/or may receive power from the computing device via the direct-access interface 220, as discussed above. The data storage device 120 may also communicate data with one or more computing devices via the network-access interface 210, as discussed above. The network-access interface 210 and direct-access interface 220 may be coupled to the controller 230.

The memory 310 includes a firmware image 320. In one embodiment, the memory 310 may be flash memory (e.g., a flash chip, NAND memory, etc.) The firmware image 320 includes firmware 321 and one or more digital signatures 322. The one or more digital signatures 322 may be used to validate the firmware image 320, as discussed in more detail below. As discussed above, the firmware 321 may be used to initiate operation of the data storage device 120 (e.g., to boot the data storage device 120). Also as discussed above, the firmware 321 may be used to operate the data storage device 120. For example, the firmware 321 may allow the data storage device 120 to read/write data to the storage drive 240. The firmware 321 may also allow the data storage device 120 to communicate with computing devices (e.g., client devices such as smartphones, laptop computers, tablet computers, etc.) via the network-access interface 210 and/or the direct-access interface 220. As discussed above, validating the firmware 321 before operating the data storage device 120, using and/or storing the firmware 321 may be useful/beneficial.

The controller 230 includes a validation module 331. The validation module 331 may be processing logic that includes hardware (e.g., circuitry, dedicated logic, programmable logic, microcode, etc.), software (e.g., instructions run on a processor to perform hardware simulation), firmware, or a combination thereof. For example, the validation module 331 may be code, instructions, etc., stored on a memory, such as a mask read-only memory (ROM). The controller 230 may execute the validation module 331 to perform the operations, functions, actions, and/or methods described herein. In another example, the validation module 331 may be separate from the controller 230 (not shown in the figures). For example, the validation module 331 may be a processing device (e.g., an ASIC) that is separate from the controller 230.

In one embodiment, the validation module 331 may determine whether the firmware image 320 (and/or firmware 321) is valid. For example, the validation module 331 may transmit a request to validate the firmware image 320, to the storage drive 240. The request may be a command (e.g., an AT Attachment (ATA) command), a message, a frame, a packet, etc., that may indicate to the storage drive 240 that the storage drive 240 should validate the firmware image 320. The validation module 331 may also provide the firmware image 320 to the storage drive 240. For example, the validation module 331 may read the firmware image 320 from the memory 310 and may transmit the firmware image 320 to the storage drive 240. In another example, the validation module 331 may allow the storage drive 240 to access the memory 310 (e.g., may allow the storage drive 240 to access the firmware image 320 directly from the memory 310). One having ordinary skill in the art understands that the validation module 331 may transmit the request and the firmware image 320 to the storage drive at the same time (e.g., the request may include the firmware image, or a message may include both the request and the firmware image 320) or separately (e.g., a first message with the request and a second message with the firmware image 320). The validation module 331 may also receive data indicative of whether the firmware image 320 is valid, from the storage drive 240. For example, the storage drive 240 may generate and/or transmit a message with a value (e.g., a number, an alphanumeric string, etc.) indicating whether the firmware image 320 is valid or invalid, as discussed in more detail below. The validation module 331 may receive the message (with the value indicating whether the firmware image 320 is valid or invalid).

In one embodiment, if the firmware image 320 is valid (e.g., if the message received from the storage drive 240 indicates that the firmware image 320 is valid), the validation module 331 may load the firmware 321 into a memory (not illustrated in FIG. 3), and the controller 230 may execute the firmware 321 to initiate operation of the data storage device 120 (e.g., to boot the data storage device 120). The controller 230 may also execute the firmware 321 to operate the data storage device 120. For example, the controller 230 may execute the firmware 321 to allow the data storage device 120 to connect to a computing device via the direct-access interface 220 and/or to allow the data storage device 120 to communicate (e.g., transmit and/or receive) data with the computing device. In another embodiment, if the firmware image is not valid (e.g., if the message received from the storage drive 240 indicates that the firmware image 320 is not valid), the validation module 331 may not load the firmware 321 into the memory and may not allow the controller 230 to execute the firmware 321. For example, the validation module 331 may refrain from initiating the operation of the data storage device 120 (e.g., may abort the boot up of the data storage device 120).

In one embodiment, if the firmware image 320 is valid (e.g., if the message received from the storage drive 240 indicates that the firmware image 320 is valid), the validation module 331 may store the firmware 321 into the memory 310 for later use. For example, during an update process (to update the firmware of the data storage device 120), the firmware image 320 may be stored in the memory 310 after the firmware image 320 has been validated. The (updated) firmware image 320 may be used to initiate operation of (e.g., boot) the data storage device 120 after the update process (e.g., after the data storage device 120 is rebooted/restarted). In another embodiment, if the firmware image is not valid (e.g., if the message received from the storage drive 240 indicates that the firmware image 320 is not valid), the validation module 331 may not store the firmware image 320 in the memory 310. This may prevent the firmware image 320 from being used to initiate operate of the data storage device 120 and/or to operate the data storage device 120.

In one embodiment, the validation module 331 may determine whether the storage drive 240 is capable of validating the firmware image 320. For example, the validation module 331 may transmit a message to the storage drive 240 to determine if the storage drive 240 is capable of validating the firmware image 320. If the storage drive 240 does not respond to the message (or if a response is received indicating that the storage drive 240 is not able to validate the firmware image 320), the validation module 331 may refrain from determining whether the firmware image has been validated. For example, the validation module 331 may not transmit the request (to validate the firmware image 320) to the storage drive 240 and/or may not provide the firmware image 320 to the storage drive 240.

As illustrated in FIG. 3, the storage drive 240 includes a processing device 341 (e.g., a processor, a central processing unit (CPU), an application-specific integrated circuit (ASIC), a field-programmable gate array (FPGA), a system-on-chip (SoC), a controller, etc.), a memory 342, a key 344, and non-volatile storage components 245. The memory 342 includes a firmware image 343. The firmware image 343 may be used to initiate operation of (e.g., boot) the storage drive 240. The firmware image 343 may also be used to operate the storage drive 240. For example, the firmware image 343 may allow the storage drive 240 to receive data access requests from the controller 230. The firmware image 343 may include firmware and/or one or more digital signatures. The memory 342 may be a flash memory (e.g., a flash chip, NAND memory, etc.). In one embodiment, the key 344 may be stored in an OTP memory of the storage drive 240. In other embodiments, the key 344 may be stored in other types of memory, such as a secure memory (e.g., a secure flash memory).

In one embodiment, the processing device 341 may validate the firmware image 343. For example, the processing device 341 may validate the firmware image 343 before initiating operation of (e.g., booting) the storage drive 240. In one embodiment, the processing device 341 may use the key 344 to validate the firmware image 343. For example, the firmware image 343 may include firmware (e.g., storage drive firmware) and a digital signature (e.g., a storage drive digital signature). The processing device 341 may decrypt the storage drive digital signature using the key 344 to obtain a first hash value. The first hash value may be referred to as an expected hash value. The processing device 341 may calculate, generate, obtain, etc., a second hash value by applying a hashing function to the storage drive firmware. The second hash value may be referred to as the generated hash value. The processing device 341 may compare the first hash value with the second hash value (e.g., compare the expected hash value with the generated hash value). If the first hash value does not match the second hash value, the processing device 341 may determine that the storage drive firmware is invalid (e.g., is not authentic) and may refrain from initiating operation of the storage drive 240 (e.g., may not boot the storage drive 240). If the first value does match the second hash value, the processing device 341 may initiate operation of the storage drive 240 using the storage device firmware. The processing device 341 may also operate the storage drive 240 using the storage drive firmware. For example, the processing device 341 may use the storage device firmware to read data from the non-volatile storage components 245 and/or to write data to the non-volatile storage components 245.

In one embodiment, the processing device 341 may receive a request to validate the firmware image 320. For example, the processing device 341 may receive a request (e.g., a message, a packet, a frame, etc.) to validate the firmware image 320 from the controller 230 and/or validation module 331, as discussed above. The processing device 341 may obtain the firmware image 320 based on the request. For example, the processing device 341 may receive the firmware image 320 from the controller 230 or may read the firmware image from the memory 310, as discussed above.

In one embodiment, the processing device 341 may determine whether the firmware image 320 is valid (e.g., whether the firmware image 320 is authentic and/or validated). The processing device 341 may decrypt a digital signature 322 to obtain a first hash value. The first hash value may be referred to as an expected hash value. The processing device 341 may calculate, generate, obtain, etc., a second hash value by apply a hashing function to the firmware 321. The second hash value may be referred to as the generated hash value. The processing device 341 may compare the first hash value with the second hash value (e.g., compare the expected hash value with the generated hash value). If the first hash value does not match the second hash value, the processing device 341 may determine that the firmware 321 and/or the firmware image 320 are invalid. If the first hash value does match the second hash value, the processing device 341 may determine that the firmware 321 and/or the firmware image 320 are valid.

In one embodiment, the processing device 341 may transmit data indicating whether the firmware image 320 is valid, to the controller 230. For example, the processing device 341 may transmit a message (e.g., a first value or other data) to the controller 230 indicating that the firmware image 320 (and/or the firmware 321) is valid, if the firmware image 320 is valid. In another example, the processing device 341 may transmit a message (e.g., a second value or other data) to the controller 230 indicating that the firmware image 320 (and/or the firmware 321) is invalid, if the firmware image 320 is invalid.

As discussed above, the firmware image 320 includes firmware 321 and one or more digital signatures 322. The one or more digital signatures 322 may correspond to different manufacturers of storage drives and/or different types of storage drives (e.g., different model numbers). Including multiple images in the firmware image 320 may allow different storage drives (e.g., different types of storage drives) to validate the firmware image 320. For example, different storage drives (e.g., different storage drives from different manufacturers) may use different keys to decrypt data. Each of the one or more digital signatures 322 may be generated (e.g., may be encrypted) using a different key. In another example, different storage drives may use different encryption/decryption algorithms/functions to encrypt/decrypt the one or more digital signatures 322. For example, a first storage drive may use the Secure Hash Algorithm (SHA) to encrypt/decrypt a first digital signature 322, and a second storage drive may use the Message-Digest algorithm (e.g., MD6) to encrypt a second digital signature 322. One having ordinary skill in the art understands that in some embodiments, the firmware image 320 may not include the one or more digital signatures 322. For example, the one or more digital signatures 322 may be stored separately from the firmware 321.

Although firmware/firmware images are discussed herein, one having ordinary skill in the art understands that the examples, implementations, and/or embodiments described herein may apply to software and/or other data that should be validated. Although data storage devices are discussed herein, one having ordinary skill in the art understands that the examples, implementations, and/or embodiments described herein may apply to other types of electronic devices (e.g., to computing devices).

Figure 4:
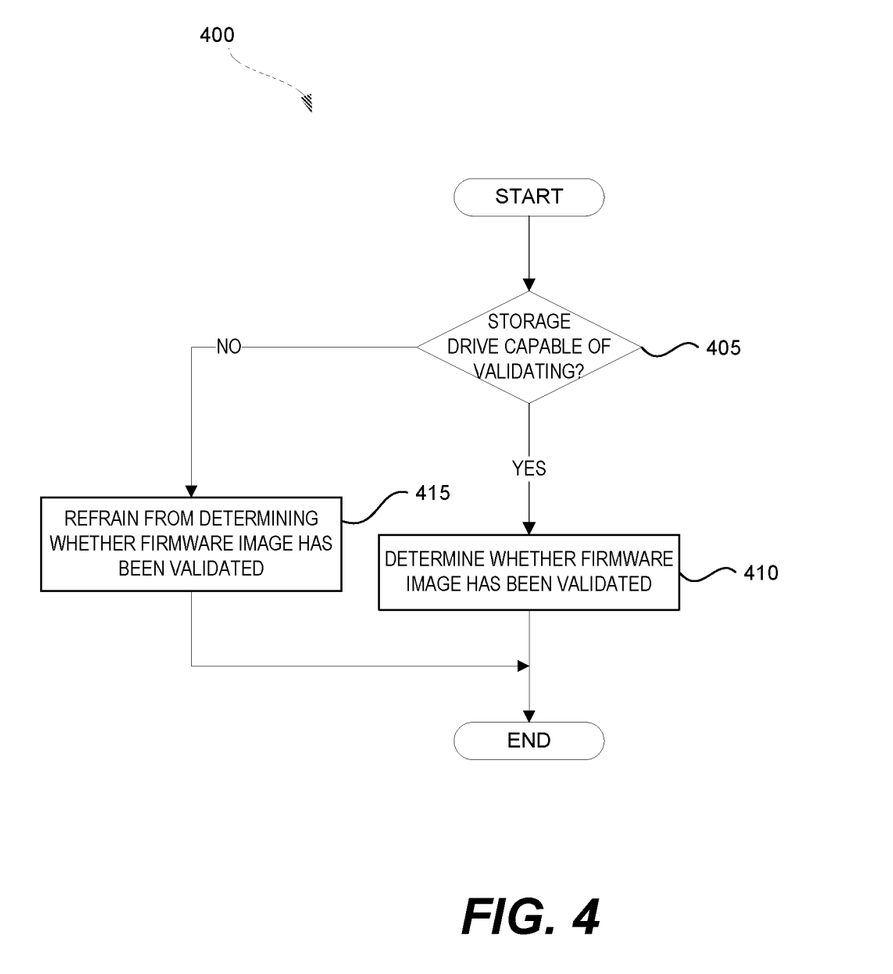
FIG. 4 is a flow diagram illustrating a process for validating a firmware image, according to an embodiment.

FIG. 4 is a flow diagram illustrating a process 400 for validating a firmware image, according to an embodiment. The process 400 may be performed by a validation module (illustrated in FIG. 3), a controller, a processing device (e.g., a processor, a central processing unit (CPU)), etc. For example, the process 400 may be performed by a controller of a data storage device. The controller, processing device, and/or validation module may be processing logic that includes hardware (e.g., circuitry, dedicated logic, programmable logic, microcode, etc.), software (e.g., instructions run on a processor to perform hardware simulation), firmware, or a combination thereof.

The process 400 begins at block 405 where the process 400 determines whether a storage drive is capable of validating a firmware image (e.g., whether the storage drive is able to support requests to validate firmware images of other devices), as discussed above. For example, the process 400 may transmit a message to the storage drive (e.g., to a processing device of the storage drive). The storage drive may transmit a response (to the message) indicating whether the storage drive is capable of validating. If the storage drive is not capable of validating the firmware image (e.g., the storage drive is unable to support requests to validate firmware images of other devices), the process 400 may refrain from determining whether the firmware image has been validated at block 415, as discussed above. For example, the process 400 may not transmit a request to validate the firmware image and/or may not transmit the firmware image to the storage drive. If the drive is capable of validating the firmware image, the process 400 may determine whether the firmware image has been validated at block 410. For example, in one embodiment, process 500 (discussed in more detail below in conjunction with FIG. 5) may be performed to determine whether the firmware image has been validated.

Figure 5:
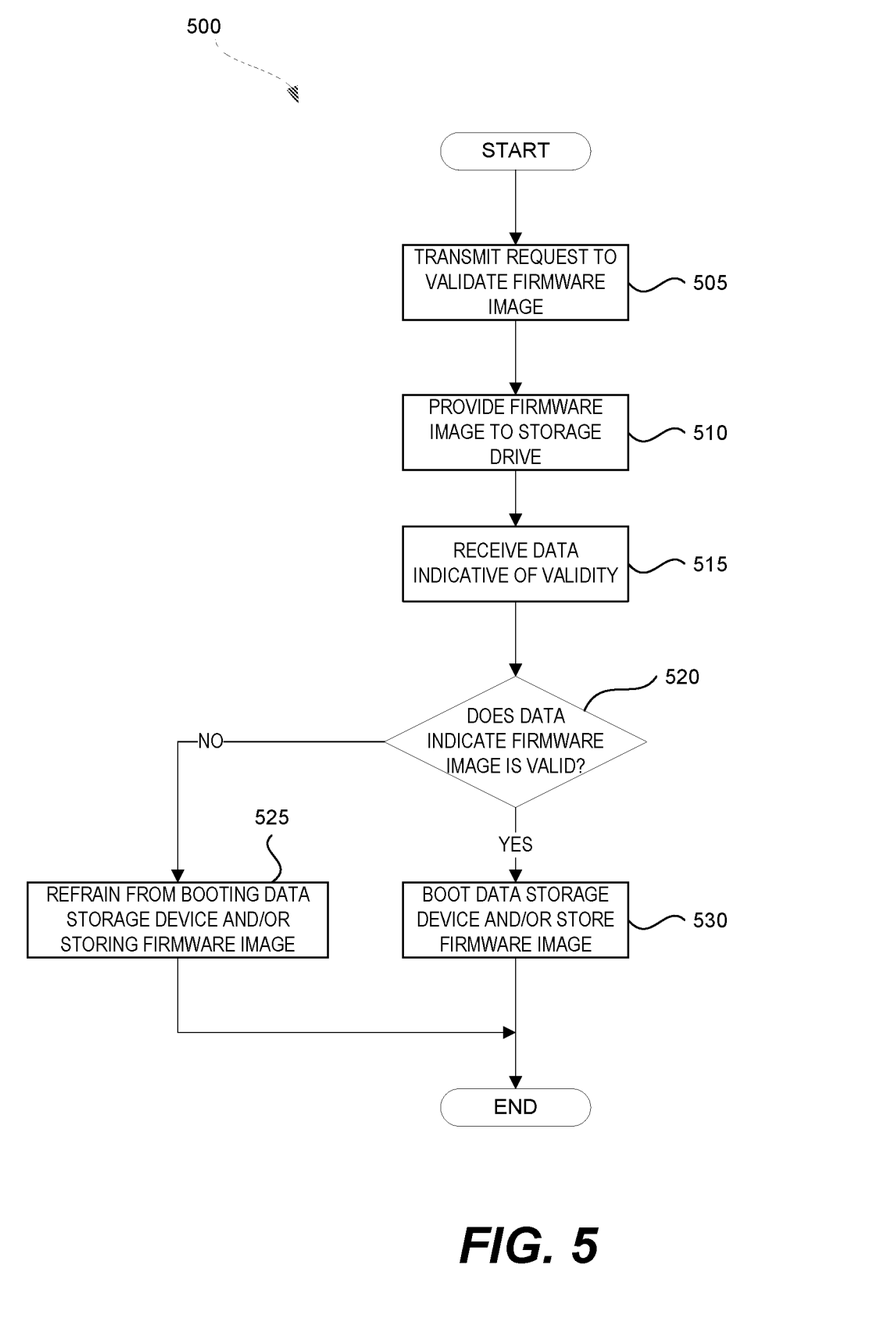
FIG. 5 is a flow diagram illustrating a process for validating a firmware image, according to an embodiment.

FIG. 5 is a flow diagram illustrating a process 500 for validating a firmware image, according to an embodiment. The process 500 may be performed by a validation module (illustrated in FIG. 3), a controller, a processing device (e.g., a processor, a central processing unit (CPU)), etc. For example, the process 500 may be performed by a controller of a data storage device. The controller, processing device, and/or validation module may be processing logic that includes hardware (e.g., circuitry, dedicated logic, programmable logic, microcode, etc.), software (e.g., instructions run on a processor to perform hardware simulation), firmware, or a combination thereof.

The process 500 begins at block 505 where the process 500 transmits a request to validate a firmware image, to a storage drive (e.g., to a processing device of a storage drive), as discussed above. For example, the process 500 may transmit a message to the storage drive requesting the storage drive to validate the firmware image. At block 510, the process 500 may provide the firmware image to the storage drive, as discussed above. For example, the process 500 may transmit the firmware image to the storage drive or may allow the storage drive to read the firmware image from a memory (e.g., from a flash memory).

At block 515, the process 500 receives data indicative of the validity of the firmware image. For example, the process 500 may receive a message indicating whether the firmware image is valid, from the storage drive. The process 500 determines whether the data (received at block 515) indicates that the firmware image is valid at block 520, as discussed above. If the data (e.g., a value, an alphanumeric value, etc.) indicates that the firmware image is invalid (e.g., is not authentic), the process 500 may refrain from booting the data storage device using the firmware image at block 525 and/or storing the firmware image, as discussed above. For example, the process 500 may abort the boot up of the data storage device. In another example, the process 500 may refrain from storing the firmware image in a memory (e.g., a flash memory), as discussed above. If the data indicates that the firmware image is valid (e.g., is authentic), the process 500 may boot the data storage device (e.g., initiate operation of the data storage device) using the firmware image at block 530 and/or may store the firmware image in a memory (e.g., a flash memory), as discussed above. For example, the firmware image may be stored in a memory for later use, as discussed above.

Figure 6:
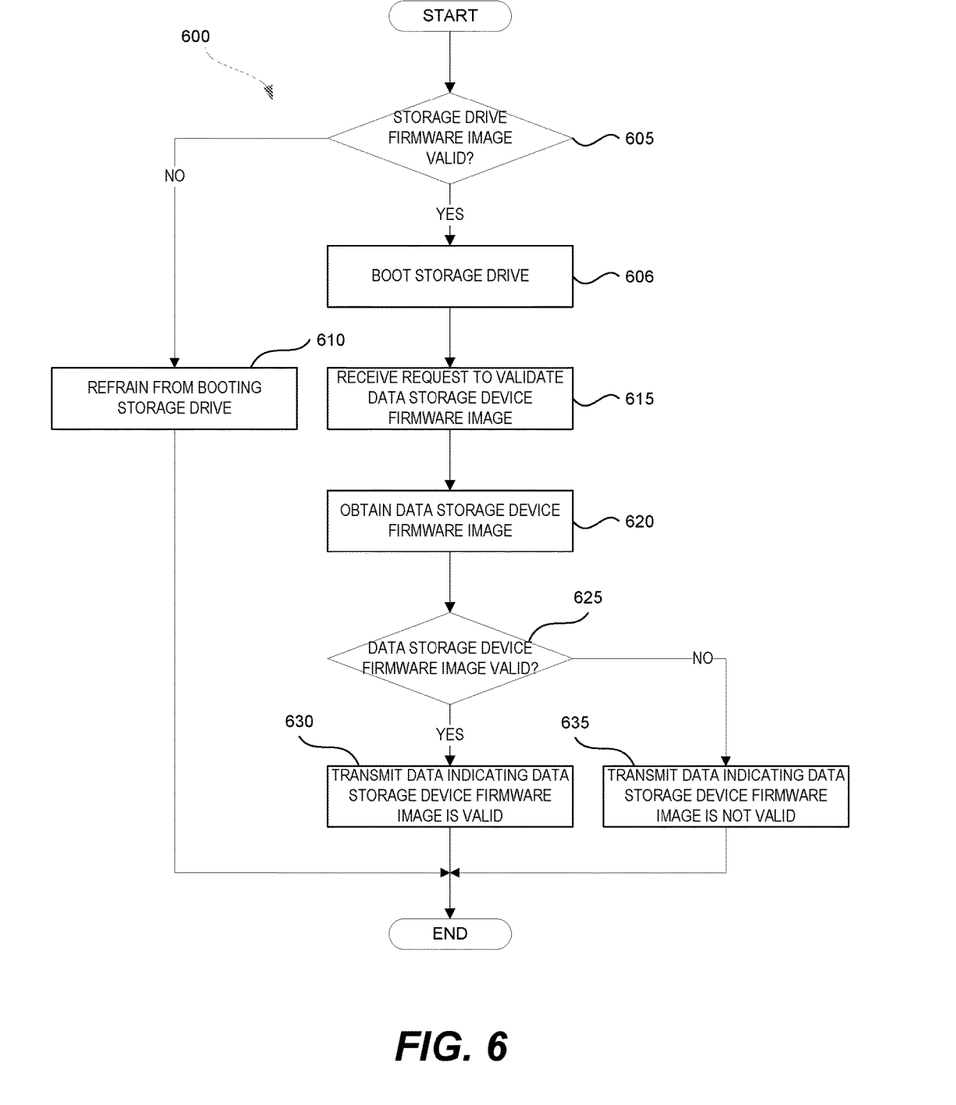
FIG. 6 is a flow diagram illustrating a process for validating a firmware image, according to an embodiment.

FIG. 6 is a flow diagram illustrating a process 600 for validating a firmware image, according to an embodiment. The process 600 may be performed by a controller, a processing device (e.g., a processor, a central processing unit (CPU)), etc. For example, the process 600 may be performed by a processing device of a storage drive, as discussed above. The controller, processing device, etc., may be processing logic that includes hardware (e.g., circuitry, dedicated logic, programmable logic, microcode, etc.), software (e.g., instructions run on a processor to perform hardware simulation), firmware, or a combination thereof.

The process 600 begins at block 605 where the process 600 determines whether a storage drive firmware image (e.g., a firmware image of the storage drive) is valid. For example, the process 600 may decrypt a digital signature of the storage drive firmware image (using a key) to obtain a first hash value, generate a second hash value based on the storage drive firmware, and compare the first hash value and the second hash value, as discussed above. If the storage drive firmware image is not valid, the process 500 may refrain from booting the storage drive at block 610, as discussed above.

If the storage drive firmware image is valid, the process 600 may boot the storage drive at block 606, as discussed above. At block 615, the process 600 may receive a request to validate a data storage device firmware image, as discussed above. For example, the process 600 may receive a message requesting validation of the data storage device firmware image, from a controller of the data storage device. The process 600 may obtain the data storage device firmware image at block 620. For example, the process 600 may receive the data storage device firmware image from the controller or may read the data storage device firmware image from a memory (e.g., from a flash memory).

At block 625, the process 600 may determine whether the data storage device firmware image is valid. For example, the process 600 may decrypt a digital signature of the data storage device firmware image (using the key) to obtain a first hash value, generate a second hash value based on the data storage device firmware, and compare the first hash value and the second hash value, as discussed above. If the data storage device firmware image is valid, the process 600 may transmit data indicating that the data storage device firmware image is valid, at block 630. For example, the process 600 may transmit a message with a first value indicating that the data storage device firmware image is valid (e.g., is authentic), to the controller. If the data storage device firmware image is invalid, the process 600 may transmit data indicating that the data storage device firmware image is invalid (e.g., is not authentic), at block 635. For example, the process 600 may transmit a message with a second value indicating that the data storage device firmware image is invalid, to the controller.

General Comments

Those skilled in the art will appreciate that in some embodiments, other types of distributed data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A data storage device, comprising:
   a storage drive comprising a processing device, the storage drive configured to:
      store a first firmware image for the storage drive; and
      validate the first firmware image using the processing device;
   a memory separate from the storage drive and configured to store a second firmware image for the data storage device; and
   a controller in communication with the storage drive, but separate from the storage drive, the controller configured to:
      provide the second firmware image to the storage drive for validation by the processing device of the storage drive;
      determine whether the second firmware image has been validated by the storage drive; and
      boot the data storage device based on the second firmware image responsive to the second firmware image having been validated by the storage drive.

2. The data storage device of claim 1, wherein the controller is further configured to:
   refrain from booting the data storage device responsive to the second firmware image having not been validated by the storage drive.

3. The data storage device of claim 1, wherein the controller is further configured to determine whether the second firmware image has been validated by:
   transmitting, to the storage drive, a request to validate the second firmware image.

4. The data storage device of claim 1, wherein the controller is further configured to determine whether the second firmware image has been validated by:
   receiving, from the storage drive, data indicative of whether the second firmware image is valid.

5. The data storage device of claim 1, wherein the controller is further configured to:
   determine whether the storage drive is capable of validating the second firmware image; and
   refrain from determining whether the second firmware image has been validated responsive to the storage drive being not capable of validating the second firmware image.

6. The data storage device of claim 1, wherein:
   the second firmware image comprises a digital signature; and
   the storage drive further comprises a key.

7. The data storage device of claim 6, wherein the second firmware image is validated based on the digital signature and the key.

8. A method of booting a storage device using a storage drive of the storage device, the storage device comprising a controller and the storage drive comprising a validation mechanism, the method comprising:
   validating a drive firmware of the storage drive using the validation mechanism;
   providing, from a memory of a data storage device, a firmware image to a storage drive of the data storage device, the firmware image different from the drive firmware;
   reusing the validation mechanism of the storage drive to validate the firmware image from the data storage device;
   determining, by the controller, whether the firmware image has been validated by the validation mechanism; and
   booting, by the controller, the data storage device based on the firmware image responsive to the firmware image having been validated by the storage drive.

9. The method of claim 8, further comprising:
   refraining from booting the data storage device responsive to the firmware image having not been validated by the storage drive.

10. The method of claim 8, wherein determining whether the firmware image has been validated comprises:
    transmitting, to the storage drive, a request to validate the firmware image.

11. The method of claim 8, wherein determining whether the firmware image has been validated comprises:
    receiving, from the storage drive, data indicative of whether the firmware image is valid.

12. A method comprising:
    determining whether a storage drive of a data storage device is capable of validating a firmware image;
    responsive to determining that the storage drive is not capable of validating the firmware image, refraining from determining whether the firmware image has been validated; and
    responsive to determining that the storage drive is capable of validating the firmware image:
       providing, from a memory of the data storage device, a firmware image to the storage drive;
       reusing a validation mechanism for validating a drive firmware of the storage drive to validate the firmware image from the data storage device;
       determining whether the firmware image has been validated by the validation mechanism; and
       booting the data storage device based on the firmware image responsive to the firmware image having been validated by the storage drive.

13. A storage drive configured to operate as part of a data storage device, the storage drive comprising:
    non-volatile memory configured to store data; and
    a processing device coupled to the non-volatile memory, the processing device configured to:

validate a drive firmware of the storage drive;

receive a request to validate a firmware image of the data storage device;

receive the firmware image from a memory of the data storage device external to the storage drive;

determine whether the firmware image is valid; and transmit, to a controller of the data storage device, validity data indicating whether the firmware image is valid;

wherein the controller is configured to boot the data storage device responsive to the validity data indicating that the firmware image is valid.

14. The storage drive of claim 13, wherein:

the firmware image comprises a digital signature; and the storage drive further comprises a key stored in the non-volatile memory.

15. The storage drive of claim 14, wherein the processing device is further configured to determine whether the firmware image is valid based on the digital signature and the key.

16. The storage drive of claim 13, wherein the processing device is further configured to:

initiate operation of the storage drive based on the drive firmware.

17. The method of claim 8, further comprising:

transmitting a digital signature of the firmware image to the storage drive for use by the validation mechanism in validating the firmware image.

18. A data storage device, comprising:

a first storage means comprising a first processing means, the first storage means configured to:

store a first firmware image for the first storage means; and validate the first firmware image using the first processing means;

a second storage means separate from the first storage means and configured to store a second firmware image for the data storage device; and a second processing means in communication with the first storage means, but separate from the first storage means, the second processing means configured to:

provide the second firmware image to the first storage means for validation by the first processing means of the first storage means;

determine whether the second firmware image has been validated by the first storage means; and boot the data storage device based on the second firmware image responsive to the second firmware image having been validated by the first storage means.

* * * * *